US012643088B2

(12) United States Patent
Reinoso et al.

(10) Patent No.: US 12,643,088 B2
(45) Date of Patent: Jun. 2, 2026

(54) MEMBRANE COMPRISING BIOPOLYMERS AND CARBON NANOMATERIALS FOR REMOVING HEAVY METALS IN POLLUTED WATERS

(71) Applicant: UNIVERSIDAD TÉCNICA FEDERICO SANTA MARÍA, Valparaíso (CL)

(72) Inventors: Elías Reinoso, Valparaíso (CL); Geraldine Dennett, Santiago (CL); Carolina Parra, Santiago (CL)

(73) Assignee: UNIVERSIDAD TÉCNICA FEDERICO SANTA MARÍA, Valparaíso (CL)

( * ) Notice: Subject to any disclaimer, the term of this patent is extended or adjusted under 35 U.S.C. 154(b) by 584 days.

(21) Appl. No.: 18/165,148

(22) PCT Filed: Aug. 6, 2020

(86) PCT No.: PCT/CL2020/050087
§ 371 (c)(1),
(2) Date: Feb. 6, 2023

(87) PCT Pub. No.: WO2022/027149
PCT Pub. Date: Oct. 2, 2022

(65) Prior Publication Data
US 2025/0222434 A1      Jul. 10, 2025

(51) Int. Cl.
B01J 20/28 (2006.01)
B01D 69/14 (2006.01)
(Continued)

(52) U.S. Cl.
CPC ...... B01J 20/28033 (2013.01); B01D 69/147 (2013.01); B01J 20/205 (2013.01);
(Continued)

(58) Field of Classification Search
CPC ............ B01D 69/147; B01D 67/00792; B01D 67/00793; B01D 67/0086; B01D 67/0088;
(Continued)

(56) References Cited

U.S. PATENT DOCUMENTS

| | | | |
|---|---|---|---|
| 6,989,102 B1 | 1/2006 | Park et al. | |
| 2019/0247793 A1* | 8/2019 | Singamaneni | ....... B01D 61/145 |

FOREIGN PATENT DOCUMENTS

| | | |
|---|---|---|
| CN | 105195111 A | 12/2015 |
| CN | 105688839 A | 6/2016 |

(Continued)

OTHER PUBLICATIONS

Standaert, Michael "China Wrestles with the Toxic Aftermath of Rare Earth Mining" https://e360.yale.edu/features/china-wrestles-with-the-toxic-aftermath-of-rare-earth-mining (published on Jul. 2, 2019; retrieved on Aug. 9, 2025) (Year: 2019).*

(Continued)

*Primary Examiner* — Benjamin L Lebron
*Assistant Examiner* — Bernadette Karen Mcgann
(74) *Attorney, Agent, or Firm* — Procopio, Cory, Hargreaves & Savitch LLP

(57) ABSTRACT

The present invention relates to a membrane for removing heavy metals present in water or other solutions contaminated with said heavy metals, wherein said membrane comprises carbon nanomaterials and a mixture of natural biopolymers, preferably nanocellulose, carbon nanotubes and diatom biomass. The present invention also comprises a method for obtaining said membrane, and a method for removing heavy metals in water or other solutions comprising the use of said membrane.

27 Claims, 4 Drawing Sheets

A

B

NFC      NFC+Didymo      NFC+CNTs      NFC+CNTs +Didymo

(51) Int. Cl.

| | |
|---|---|
| *B01J 20/20* | (2006.01) |
| *B01J 20/24* | (2006.01) |
| *B01J 20/30* | (2006.01) |
| *B01J 20/34* | (2006.01) |
| *B01J 23/75* | (2006.01) |
| *B01J 37/04* | (2006.01) |
| *B01J 37/08* | (2006.01) |
| *C01B 32/162* | (2017.01) |
| *C02F 1/28* | (2023.01) |
| *C02F 101/20* | (2006.01) |

(52) U.S. Cl.

CPC ........... *B01J 20/24* (2013.01); *B01J 20/3021* (2013.01); *B01J 20/3416* (2013.01); *B01J 20/3425* (2013.01); *B01J 20/3475* (2013.01); *B01J 23/75* (2013.01); *B01J 37/04* (2013.01); *B01J 37/08* (2013.01); *C01B 32/162* (2017.08); *C02F 1/288* (2013.01); *C01B 2202/06* (2013.01); *C02F 1/283* (2013.01); *C02F 1/286* (2013.01); *C02F 2101/20* (2013.01); *C02F 2303/16* (2013.01)

(58) Field of Classification Search

CPC .... B01J 20/205; B01J 20/24; B01J 20/28033; B01J 20/3021; B01J 20/3416; B01J 20/3425; B01J 20/3475; B01J 23/75; B01J 37/04; B01J 37/08; B01J 20/20; B01J 20/22; B01J 20/28007; B01J 20/3078; C01B 2202/06; C01B 32/162; C02F 1/283; C02F 1/286; C02F 1/288; C02F 2101/20; C02F 2303/16; C02F 1/00; C02F 1/28; C02F 2101/103; C02F 2101/22; C02F 2305/08; C02F 3/32

See application file for complete search history.

(56) References Cited

FOREIGN PATENT DOCUMENTS

| CN | 110052252 A | * | 7/2019 | ........ B01J 20/28033 |
|---|---|---|---|---|
| ES | 2642462 B1 | | 9/2018 | |
| KR | 100732464 B1 | | 6/2007 | |
| KR | 101692357 B1 | | 1/2017 | |
| KR | 20180092545 A | | 8/2018 | |
| TW | I411582 | | 10/2013 | |
| TW | I419844 B | | 12/2013 | |

OTHER PUBLICATIONS

Zgłobicka, I., et.al., 2017. Microstructure and nanomechanical properties of single stalks from diatom Didymosphenia geminata and their change due to adsorption of selected metal ions. Journal of Phycology, 53(4), pp. 880-888 (Year: 2017).*

Wysokowski, M., et.al., 2017. Adhesive stalks of diatom Didymosphenia geminata as a novel biological adsorbent for hazardous metals removal. Clean-Soil, Air, Water, 45(11), p. 1600678 (Year: 2017).*

Machine generated translation of CN-110052252-A (Year: 2019).*

Lakherwal, Dimple. "Adsorption of Heavy Metals: A Review". International Journal of Environmental Research and Development. ISSN 2249-3131 vol. 4, No. 1 (2014), pp. 41-48. © Research India Publications http://www.ripublication.com/ijerd.htm. Cited in Specification. English Language. 8 pages.

Pizarro, Jaime et al. "Heavy metals in northern Chilean rivers: Spatial variation and temporal trends". Departamento de Ingeniería Geográfica, Facultad de Ingeniería, Universidad de Santiago de Chile, Av. Lib. B. O'Higgins 3363, Santiago, Chile. Journal of Hazardous Materials 181 (2010) 747-754.

Romero, L. et al. Arsenic enrichment in waters and sediments of the Rio Loa (Second Region, Chile). L. Romero et al. / Applied Geochemistry 18 (2003) 1399-1416. Copyright 2003 Elsevier Science Ltd. All rights reserved. doi:10.1016/S0883-2927(03)00059-3. Cited in Specification. English Language. 18 pages.

* cited by examiner

A                                    B

A

B

C

D

E

A

B

C

A

B

MEMBRANE COMPRISING BIOPOLYMERS AND CARBON NANOMATERIALS FOR REMOVING HEAVY METALS IN POLLUTED WATERS

TECHNICAL FIELD

The present invention relates to the technical field of nanotechnology, particularly it refers to a membrane comprising carbon nanomaterials and a mixture of natural biopolymers, a method for obtaining said membrane, and a method for removing heavy metals present in water or other solutions contaminated with said heavy metals, wherein the method comprises the use of said membrane.

BACKGROUND OF THE INVENTION

In the world, many water sources are constantly exposed to contamination by heavy metals, which originate from both natural and anthropogenic sources. Particularly in Chile, studies have shown the presence of arsenic (As), lead (Pb), copper (Cu), mercury (Hg), chromium (Cr) and molybdenum (Mo) in the Elqui, Loa and Rapel rivers (Romero L. et al. Arsenic enrichment in waters and sediments of the *Loa* River (Second Region, Chile). *Appl. Geochem.* 2003. 18:1339-1416; Pizarro J. et al. Heavy metals in northern Chilean rivers: Spatial variation and temporal trends. *J. Hazard. Mater.* 2010. 181:747-754). The presence of these metals has its natural origin in soil erosion, volcanic eruptions, and weathering of rocks due to rainfall, while the use of fossil fuels and mining and metallurgical activities are among the major producers of these pollutants.

The problem of contamination of rivers and groundwater is of great concern, since it affects agriculture and the distribution of drinking water, thus causing a series of diseases in humans.

Among the processes currently used for the treatment of wastewater from mining processes and effluents contaminated with heavy metals are techniques based on absorption/desorption, precipitation, ion exchange, membrane filtration, electrodialysis, flocculation, etc. However, many of them have the disadvantage of generating a large amount of sludge containing heavy metals, and also have high maintenance costs due to their short useful life, which results in the constant replacement of filters, membranes and resins.

Of these methods, the most widely used are adsorption/desorption-based processes that have a higher efficiency for removing heavy metal ions in contaminated effluents, they have a low production cost and high flexibility in design and operation. Adsorbent materials commonly used to remove heavy metals from wastewater effluents include activated carbon, zeolite, clay minerals, and biomaterials such as natural polymers or biopolymers (e.g., cellulose, chitin, chitosan, gelatin, alginate, etc.) and biomass of various organisms (Lakherwal D. Adsorption of Heavy Metals: A Review. *Int. J. Environ. Sci. Dev.* 2014. 4 (1): 41-48).

Biomaterials are the most efficient adsorbent materials so far, due to their well-developed porous structure and relatively large adsorption capacity. In the state of the art there are several heavy metal adsorption technologies based on biomaterials such as those described below.

Regarding the use of biopolymers, the U.S. Pat. No. 6,989,102B1 describes an alginate-based adsorbent material for water purification, which allows the removal of heavy metal ions and other contaminating materials. The patent KR101692357B1 describes a water purification filter comprising chitosan for removing heavy metals. Cellulosic materials are also used, such as the ones described in the patent CN105688839A that discloses a method for preparing an adsorbent material comprising nanocellulose fibers functionalized with amino groups. Similarly, the patent CN105195111A describes a magnetic nanocellulose composite coated with polyethyleneimine-modified chitosan for the adsorption of heavy metals and the method for obtaining the same. However, these biopolymers do not provide high removal efficiency for different types of heavy metals when treating wastewater.

Regarding the use of biomass for the adsorption of heavy metals, the patent TWI419844B describes the use of Cladophora algae powder in suspension to remove heavy metals from aqueous media. Similarly, the document TWI411582B describes the use of Spirogyra algae powder in suspension to remove heavy metals from aqueous media. In the same line, the patent KR100732464B1 describes the use of a biomass powder (live or dead) from algae *Chlorella vulgaris, Chlorella pyrenoidosa,* and *Chlorella ellipsoidea* for the adsorption of nickel and copper present in aqueous solutions. There is also the use of live microalgae cultures for removing heavy metals in water purification reactors, as described in patents KR20180092545A and ES2642462B1. However, the absorption of heavy metals with these biomasses involves the deterioration of the mechanical properties of the biopolymers that the algae or microalgae produce; furthermore, these biomasses require complex reactor systems or filtration equipment to be used.

Consequently, it is necessary to develop new alternatives for removing heavy metals in water or other contaminated solutions that are more efficient than the ones currently available in the state of the art, and whose use and manufacture is simple and economical.

SUMMARY OF THE INVENTION

A first subject matter of the present invention relates to a membrane for removing heavy metals present in contaminated waters or solutions comprising nanocellulose, carbon nanotubes and diatom biomass.

Preferably, the nanocellulose is selected from the group consisting of cellulose nanocrystals and nanofibrillated cellulose, more preferably nanofibrillated cellulose.

The carbon nanotubes are preferably selected from the group consisting of single-layered or single-walled carbon nanotubes (SWNTs), multi-layered or multi-walled carbon nanotubes (MWNTs), and carbon nanotubes, whose wall structure is indefinite, more preferably the carbon nanotubes are of the multi-walled type.

Preferably, the diatom biomass is one or a mixture of species of the *Didymosphenia* diatom, more preferably it is biomass of *Didymosphenia geminata*. In a preferred embodiment, the diatom biomass is stems of diatoms, preferably stems of the *Didymosphenia* diatom, even more preferably stems of the *Didymosphenia geminata* diatom.

In a preferred embodiment, the carbon nanotubes are in a concentration of 0.5-3% w/w of the total weight of the membrane, the nanocellulose is in a suspension of 2-4% w/v in water, and the diatom biomass is in a ratio of 1:1 to 4:1 with respect to the nanocellulose.

A second subject matter of the present invention is a method for obtaining a membrane for removing heavy metals present in contaminated waters or solutions comprising the steps of:

a. providing a diatom biomass, carbon nanotubes, and nanocellulose;

b. mixing the diatom biomass with the carbon nanotubes;

c. adding said mixture of diatom biomass and carbon nanotubes into the nanocellulose and mixing until a paste is formed; and d. drying the paste to obtain a membrane.

Preferably, the diatom biomass used in this method is one or a mixture of species of the *Didymosphenia* diatom, more preferably it is biomass of *Didymosphenia geminata*. In a preferred embodiment, from the diatom biomass are obtained the stems of diatoms, preferably stems of the *Didymosphenia* diatom, even more preferably stems of the *Didymosphenia geminata* diatom.

In a preferred embodiment, to obtain diatom stems from diatom biomass, the method further comprises the steps of:

a. extracting diatom biomass from an environment where it is found;

b. mixing said diatom biomass with an ethanol solution and stirring; and c. filtering this mixture to obtain a solid phase and a liquid phase, where the solid phase is the diatom stems.

Preferably, said environment where the diatom biomass is found is selected from the group consisting of a marine environment and a freshwater environment, more preferably said freshwater environment is selected from the group consisting of a river and/or a lake.

In a preferred embodiment, the method for obtaining stems from diatom biomass comprises repeating steps (b) and (c) between 2 to 8 times. In a preferred embodiment, the ethanol solution is of 50% to 70% v/v. In another preferred embodiment, stirring is performed by low frequency ultrasound (between 30 to 50 kHz) for 10 to 30 minutes.

In a preferred embodiment, the method for obtaining diatom stems from diatom biomass further comprises the steps of:

a. drying the diatom stems;

b. grinding these dried stems;

c. sieving these ground stems to obtain particles of a size of 100 to 1000 μm.

Preferably, the diatom stems are dried at a temperature of 20-70° C., for 12 to 18 hours. Preferably, the dried diatom stems are ground for 5 to 30 minutes. In a preferred embodiment, the particles obtained have a size of 300 μm.

In another preferred embodiment, the carbon nanotubes used in the method for obtaining a membrane for removing heavy metals present in contaminated waters or solutions are preferably selected from the group consisting of single-layered or single-walled carbon nanotubes (SWNTs), multi-layered or multi-walled carbon nanotubes (MWNTs), and carbon nanotubes, whose wall structure is indefinite, more preferably the carbon nanotubes are of the multi-walled type.

In a preferred embodiment, to provide the carbon nanotubes these are synthesized with a chemical vapor deposition (CVD) method. This method uses a catalyst, wherein said catalyst comprises $Al_2O_3$ and hydrated salts of Fe and Co.

In another preferred embodiment, said catalyst is synthesized by a method comprising the steps of:

a. mixing $Al_2O_3$, $Fe_2(C_2O_4)5H_2O$ and $Co(C_2H_3O_2)_2+4H_2O$ in a ratio of 1:1:10 and 2:5:10 with respect to the weight of $Al_2O_3$ and the hydrated salts of Fe and Co; and b. calcining this mixture at a temperature of 600-750° C. until the catalyst is obtained.

Preferably, the compounds $Al_2O_3$, $Fe_2(C_2O_4)_5H_2O$ and $Co(C_2H_3O_2)_2+4H_2O$ are mixed in a ratio of 2:2:10 and 2:4:10 with respect to the weight of $Al_2O_3$ and the hydrated salts of Fe and Co.

In another preferred embodiment, the chemical vapor deposition method uses ethylene and argon at flow rates of 100 and 500 sccm. Preferably, the chemical vapor deposition method is performed at a temperature of 700-800° C.

In another preferred embodiment, the nanocellulose used in the method for obtaining a membrane for removing heavy metals present in contaminated waters or solutions is selected from the group consisting of cellulose nanocrystals and nanofibrillated cellulose, more preferably nanofibrillated cellulose.

In another preferred embodiment of the method for obtaining a membrane for removing heavy metals, the step of mixing the nanocellulose with diatom biomass and carbon nanotubes to obtain a paste is performed at a speed of 15,000-18,000 rpm for 5 to 30 minutes. Preferably, said paste is dried at a temperature of 20-25° C. 25 for 12 to 18 hours.

A third subject matter of the present invention is a method for removing heavy metals present in contaminated waters or solutions comprising the steps of:

a. providing a membrane comprising nanocellulose, carbon nanotubes and diatom biomass;

b. contacting the membrane with the contaminated water until the membrane adsorbs the heavy metals; and c. removing the membrane with the adsorbed heavy metals from the water.

The membrane used in this method preferably comprises nanocellulose, which is selected from the group consisting of cellulose nanocrystals and nanofibrillated cellulose, more preferably nanofibrillated cellulose.

The membrane used in this method comprises carbon nanotubes that are preferably selected from the group consisting of single-layered or single-walled carbon nanotubes (SWNTs), multi-layered or multi-walled carbon nanotubes (MWNTs), and carbon nanotubes, whose wall structure is indefinite, more preferably the carbon nanotubes are of the multi-walled type.

The membrane used in this method comprises diatom biomass, which preferably is one or a mixture of species of the *Didymosphenia* diatom, more preferably is biomass of *Didymosphenia geminata*. In a preferred embodiment, the diatom biomass is diatom stems, preferably stems of the *Didymosphenia* diatom, even more preferably stems of the *Didymosphenia geminata* diatom.

In a preferred embodiment of this third subject matter of the present invention, the membrane adsorbs heavy metals, which are selected from the group consisting of lead, arsenic, copper, mercury, chromium, cadmium, cobalt, magnesium, manganese, calcium, nickel, and molybdenum.

BRIEF DESCRIPTION OF THE FIGURES

FIG. 1A shows an image of such stems obtained by reflection optical microscopy and FIG. 1B shows an image of such stems obtained by transmission optical microscopy.

FIG. 2A shows a photograph of *D. geminata* stem powder. FIG. 2B shows a photograph of a dispersion of carbon nanotubes (left) and nanofibrillated cellulose (right). FIG. 2C shows a photograph of the homogenized mixture of *D. geminata* stem powder, nanocellulose and carbon nanotubes. FIG. 2D shows a photograph of a membrane of *D. geminata* and nanofibrillated cellulose. FIG. 2E shows a photograph of a membrane of *D. geminata*, nanofibrillated cellulose, and carbon nanotubes.

FIG. 3A shows a 10 μm scale image with arrows pointing to stems of *D. geminata*. FIG. 3B shows a 5 μm scale image with arrows pointing to nanofibrillated cellulose fibers. FIG. 3C shows a 2 μm-scale image with arrows pointing to carbon nanotubes.

FIG. 4A shows a graph with a $Pb^{+2}$ adsorption kinetic curve over time comprising comparison with the $Pb^{+2}$ adsorption kinetic curve over time of: nanofibrillated cellulose membrane (NFC), nanofibrillated cellulose membrane and *D. geminate* (NFC+Didymo), nanofibrillated cellulose membrane and carbon nanotubes (NFC+CNTs) and nanofibrillated cellulose membrane, *D. geminata* and carbon nanotubes (NFC+Didymo+CNTs). FIG. 4B shows photographs of these membranes immersed in a solution containing $Pb^{+2}$.

DETAILED DESCRIPTION OF THE INVENTION

Figure 1:
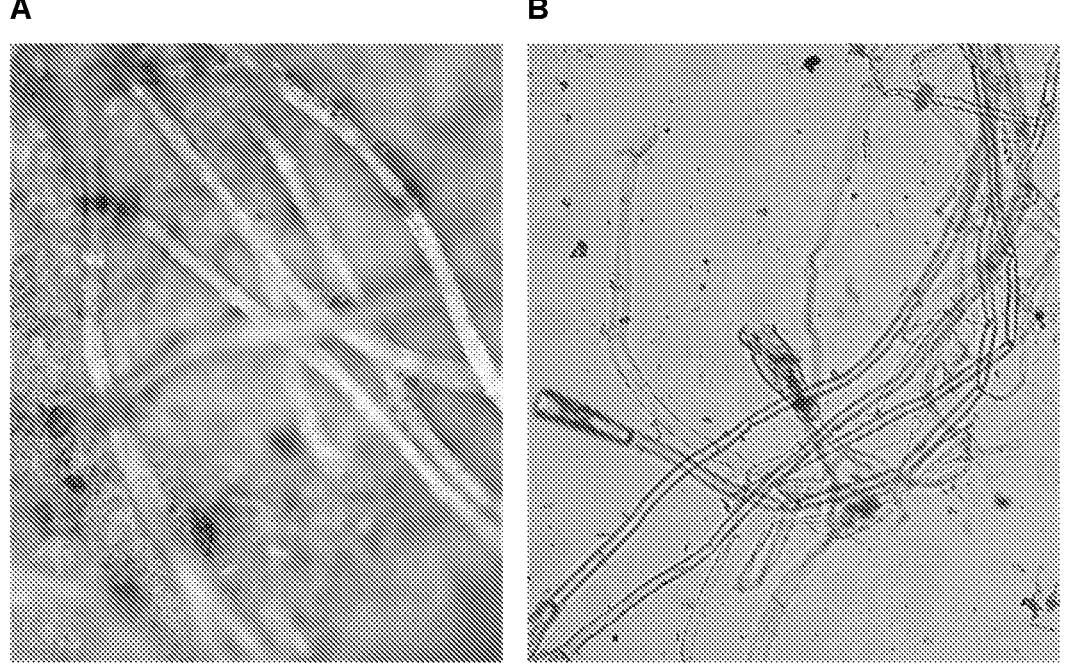
FIG. 1 shows optical microscopy images of *Didymosphenia geminata* stems.

The present invention refers to a membrane comprising carbon nanomaterials and a matrix including a mixture of natural polymers (biopolymers), which presents a high adsorption efficiency of heavy metals present in contaminated waters or solutions. This membrane is simple, easy to use and environmentally friendly.

The present invention also refers to a method of manufacturing or obtaining said membrane and a method for removing heavy metals present in contaminated waters or solutions comprising the use of said membrane. One of the main advantages of this method is that no residual sludge containing heavy metals is generated, as other purification techniques currently employed do.

All technical and scientific terms used to describe the present invention have the same meaning a person with basic knowledge in the technical field in question will understand. However, in order to define the following scope of the invention more clearly, a list of the terminology used in this description and the meaning thereof is included.

The term "contaminated water" or "contaminated solutions" should be understood indistinctly as water or solutions containing one or more heavy metals, which is the reason why they are contaminated.

The term "carbon nanomaterials" refers to materials made up of carbon atoms, whose sizes are in the nanometer scale. Some examples of these nanomaterials are graphene, carbon nanotubes (CNTs), nanodiamonds, carbon nanofibers, carbon dots, fullerenes, among others.

The term "carbon nanotubes" or "CNTs" should be understood as tubular or cylindrical carbon structures with diameters in the nanometer scale, typically less than 100 nm. These carbon nanotubes can be single-layered or single-walled nanotubes (SWNTs), multi-layered or multi-walled nanotubes (MWNTs), or nanotubes, whose wall structure is indefinite.

"Biomass" should be understood as biological mass or organic matter of eukaryotic or prokaryotic origin.

The term "nanocellulose" should be understood as nanostructured cellulose, which can be cellulose nanocrystals or nanofibrillated cellulose. By the terms "nanofibrillated cellulose", "CNF", "NCF" or "cellulose nanofibrils" used interchangeably, cellulose fibers, whose thicknesses are in the nanometer scale, typically between 1-50 nm, and with broad length sizes, typically in the micrometer scale, are to be understood.

A first subject matter of the present invention relates to a membrane comprising carbon nanomaterials and a mixture of natural polymers or biopolymers.

In a preferred embodiment of the invention, the carbon materials are carbon nanotubes, preferably selected from the group consisting of single-layered or single-walled nanotubes (SWNTs), multi-layered or multi-walled nanotubes (MWNTs), and nanotubes, whose wall structure is indefinite. In an even more preferred embodiment of the invention, the carbon materials are multi-walled type carbon nanotubes (MWCNTs), without being limited to this one mentioned.

Said biopolymers are preferably nanocellulose, which may be cellulose nanocrystals or nanofibrillated cellulose, even more preferably, nanofibrillated cellulose (NFC), and a biomass.

Said biomass is preferably a microorganism belonging to the group of microalgae, more preferably to the class of diatoms (also called Diatomea, Diatomeae, Diatomophyceae, Bacillariae, Bacillariophyta or Bacillariophyceae). In a preferred embodiment, the biomass is one or a mixture of species of the *Didymosphenia* diatom such as, for example, *D. clavaherculis*, *D. curvata*, *D. curvirostrum*, *D. dentata*, *D. geminata*, *D. lineata*, *D. neocaledonica*, *D. pumila*, *D. siberic* a, *D. tatrensis*, *D. fossilis*, etc. Preferably, the biomass used in the present invention is biomass of *Didymosphenia geminata* (previously known as *Echinella geminata* or *Gomphonema geminatum* or by its common name Didymo).

In a preferred embodiment, the membrane of the present invention comprises stems that are obtained from the biomass of any diatom, more preferably from any of the previously mentioned *Didymosphenia* species, even more preferably it comprises the stems of *Didymosphenia geminata*.

It is interesting to note that diatom biomass, particularly the *Didymosphenia* diatom has a high propagation capability, seriously degrading aquatic ecosystems especially in rivers and lakes in different parts of the world. Therefore, the use of diatom biomass in the membrane of the present invention also provides an added value to this environmentally polluting biomass.

In another preferred embodiment of the invention, the carbon nanotubes are in a concentration of 0.5 and 3% w/w of the total weight of the membrane, more preferably between 1 and 2% w/w of the total weight of the membrane. In another preferred embodiment of the invention, the nanocellulose is in a suspension of 2 and 4% w/v in water, more preferably in a suspension of 3% w/v. In another preferred embodiment of the invention, the diatom biomass is in a ratio of 1:1 and 4:1 with respect to the nanocellulose, more preferably in a ratio of 2:1 and 3:1 with respect to the nanocellulose.

A second subject matter of the present invention is a method for obtaining a membrane for removing heavy metals present in contaminated waters or solutions comprising the steps of:

a. providing a diatom biomass, carbon nanotubes, and nanocellulose;

b. mixing the diatom biomass with the carbon nanotubes;

c. adding said mixture of diatomaceous biomass and carbon nanotubes into the nanocellulose and mixing until a paste is formed; and d. drying the paste to obtain a membrane.

The nanocellulose used in the present method functions as a support matrix for the membrane. In a preferred embodiment, the nanocellulose provided may be cellulose nanocrystals or nanofibrillated cellulose, preferably, nanofibrillated cellulose (NFC).

The diatom biomass (as previously mentioned) is preferably one or a mixture of species of the *Didymosphenia* diatom such as, for example, *D. clavaherculis, D. curvata, D. curvirostrum, D. dentata, D. geminata, D. lineata, D. neocaledonica, D. pumila, D. siberica, D. tatrensis, D. fossilis*, etc. Preferably, the biopolymers used in the present invention are obtained from the biomass of *Didymosphenia geminata*, commonly called rock snot or Didymo. Even more preferably, the biopolymers used are derived from the stems of any diatom, more preferably from any of the previously mentioned species of *Didymosphenia*, even more preferably from the stems of *Didymosphenia geminata*.

Due to the fact that stems obtained from diatom biomass are preferably used, in a preferred embodiment of the present invention a number of additional steps are performed to provide said diatom stems. Thus, the method further comprises the steps of:

a. extracting diatom biomass from an environment where it is found;

b. mixing said diatom biomass with an ethanol solution and stirring; and c. filtering this mixture so as to obtain a solid phase and a liquid phase, where the solid phase is the diatom stems.

Diatoms are commonly found in any type of aquatic ecosystem, including surface waters such as puddles or wet surfaces. In a preferred embodiment of the invention, the diatom biomass is extracted from an environment, which may be a marine (saltwater) environment or a freshwater environment. Marine environments include oceans, seas and marshes (salt marshes or wetlands), mangroves, intertidal zone, among others. Within freshwater environments include lakes, rivers, ponds, streams, brooks, creeks, watercourses, springs, fountains, marshes, swamps, wetlands, among others. In a preferred embodiment, the diatom biomass is extracted from a river or lake.

After obtaining the diatom biomass, it is cleaned and processed to obtain the diatom stems. The cleaning is performed by mixing said biomass with an ethanol solution. Preferably, said ethanol solution is of 50% and 70% v/v.

The mixture of the biomass with the ethanol solution is stirred (step b) and then filtered to obtain a liquid phase and a solid phase, where said solid phase corresponds to the stems of said diatoms (step c). Said liquid phase is discarded. In a preferred embodiment of the present invention, the stirring is performed by low frequency ultrasound (between 30 and 50 kHz) for a period between 10 to 30 minutes. This procedure is performed to clean and separate the stems from the diatom biomass cells.

In a preferred embodiment of the present invention, stages (b) and (c) are repeated between 2 to 8 times. That is, the solid phase obtained from stage (c) is mixed with a new ethanol solution and stirred (stage b), and then filtered to obtain a second solid phase and a second liquid phase (stage c), and so on, between 2 to 8 times.

In another embodiment of the method of the present invention, after obtaining the diatom stems the following steps can be carried out:

a. drying the stems of diatoms;

b. grinding these dried stems;

c. sieving these ground stems to obtain particles of a size of 100 to 1000 μm.

Preferably, the diatom stems are dried in an oven at a temperature of 20-70° C., still more preferably at a temperature of approximately 40° C. After the diatom stems are dried, the diatom stems are preferably ground for 5 to 30 minutes until a fine powder is obtained. The grinding can be done by any conventional method known in the state of the art. This fine powder (ground stems) is sieved to preferably obtain particles of a size of 300 μm.

Preferably, the carbon nanotubes used in the method for obtaining the membrane of the present invention are selected from the group consisting of single-walled or single-layered nanotubes (SWNTs), multi-layered or multi-walled nanotubes (MWNTs), and nanotubes, whose wall structure is indefinite. In an even more preferred embodiment of the invention, the carbon materials are multi-walled type carbon nanotubes (MWCNTs), without being limited to the one mentioned.

To provide the carbon nanotubes, these can be purchased commercially or synthesized by any method known in the state of the art. In a preferred embodiment of the invention, the carbon nanotubes are synthesized by the chemical vapor deposition or CVD method. To carry out this method, it is required to obtain a catalyst. This catalyst necessary for the growth of carbon nanotubes comprises, preferably, $Al_2O_3$ and hydrated salts of Co and Fe.

Said catalyst can be obtained commercially or can be synthesized by any method known in the state of the art. In a preferred embodiment of the invention, the catalyst is synthesized by a method comprising the steps of:

a. mixing $Al_2O_3$, $Fe_2(C_2O_4)5H_2O$ and $Co(C_2H_3O_2)_2+4H_2O$ in a ratio of 1:1:10 and 2:5:10 with respect to the weight of $Al_2O_3$ and the hydrated salts of Fe and Co; and b. calcining this mixture at a temperature of 600-750° C. until the catalyst is obtained.

Preferably, the compounds $Al_2O_3$, $Fe_2(C_2O_4)5H_2O$ and $Co(C_2H_3O_2)_2+4H_2O$ are mixed in a 2:2:10 and 2:4:10 ratio with respect to the weight of $Al_2O_3$ and the hydrated salts of Fe and Co.

In a preferred embodiment, for the chemical vapor deposition method, ethylene is used as the carbon precursor gas. Preferably, for the synthesis of the carbon nanotubes, ethylene and argon are used at flow rates between 100 and 500 standard cubic centimeters per minute (sccm), even more preferably at 300 sccm. The temperature at which this method is carried out is preferably of 700-800° C., even more preferably at 800° C.

A critical aspect in the method for obtaining the membrane is to achieve a good dispersion of the carbon nanotubes. Therefore, the carbon nanotubes are first mixed with the diatom biomass, and then the nanocellulose is added into the mixture. If all these components are mixed at the same time, the degree of dispersion of the carbon nanotubes will not be optimal.

After adding the nanocellulose into the mixture of diatom biomass and carbon nanotubes, these components are mixed into a paste. This mixing is preferably carried out at a speed of 15,000-18,000 rpm for 5 to 30 minutes. Subsequently, the paste is subjected to a drying step at room temperature or at 20-25° C.

To form a membrane, the paste can optionally be placed in molds of any shape and size. After the drying step, the membrane is of 0.3 and 5.0 mm thick.

A third subject matter of the present invention is a method for removing heavy metals present in contaminated waters or solutions comprising the steps of:

a. providing a membrane comprising nanocellulose, carbon nanotubes and diatom biomass;

b. contacting the membrane with the contaminated water until the membrane adsorbs the heavy metals; and c. removing the membrane with the adsorbed heavy metals from the water.

In a preferred embodiment, the membrane used for removing heavy metals corresponds to the one described previously in the first subject matter of the present invention. Said membrane is capable of adsorbing heavy metals such as lead, arsenic, copper, mercury, chromium, cadmium, cobalt, magnesium, manganese, calcium, nickel, and molybdenum, without being limited to these ones.

The contact time of the membrane with the contaminated water depends on operational variables such as pH, temperature, metal concentration, stirring, among other factors, which in turn depend on the type of metal to be adsorbed to find the optimum operating variables. In a preferred embodiment of the invention, the membrane is capable of adsorbing about 95% in a period of less than 10 hours.

After removing the membrane from the water, a metal desorption step can optionally be carried out, which can have a double function: to have the option of reusing the membrane and, in addition, to recover the metal for subsequent valorization. The desorption process comprises a stage of exposing the membrane to an acid solution. The type of acid and pH used depends on the type of metal that the membrane adsorbs. For example, in the case of lead, a 0.03M acetic acid solution at pH 1.5 is used.

The following are examples of embodiments of the invention, which have been included for the purpose of illustrating the invention, the preferred embodiments, and comparative examples thereof, but in no case should they be considered to restrict the scope of the patent application, which is only delimited by the contents of the attached claims.

EXECUTION EXAMPLES

Example 1. Obtaining the Membrane for Removing Heavy Metal

To prepare the membrane, it was first necessary to obtain the diatom biomass, nanocellulose and carbon nanotubes.

Figure 2:
FIG. 2 shows photographs of the membrane preparation process.
Figure 2:
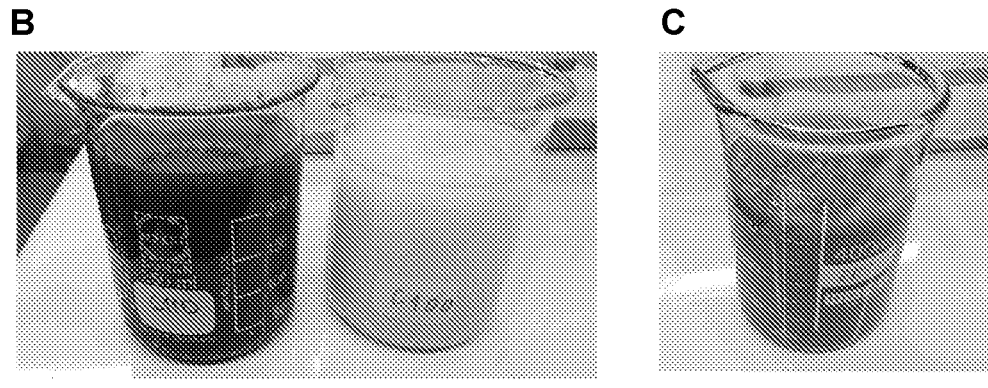
Figure 2:
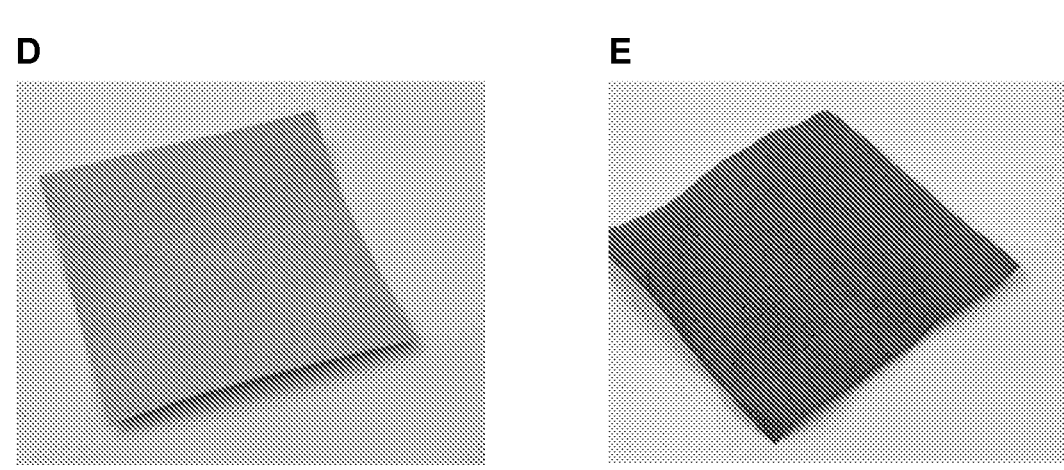

For this test, the biomass from *Didymosphenia geminata* diatom was chosen. This was collected from the Blanco river in Tierra del Fuego, Chile, and stored in a 95% v/v ethanol solution. The collected biomass was then cleaned by adding 600 mL of a 50% v/v ethanol solution to 400 mL of biomass. This mixture was subjected to ultrasound at low frequency (30 kHz) for 15 minutes. A solid phase and a liquid phase were obtained, which were separated by cloth filters. The liquid phase was discarded. To the solid phase a 50% v/v ethanol solution was added again, it was subjected to ultrasound at low frequency (30 kHz) for 15 minutes and again the solid and liquid phases obtained were separated. This procedure was repeated 4 times. This cleaning allowed separating the stems from the cells of *D. geminata*, where the solid phase obtained corresponds to the stems, as shown in FIGS. 1A and 1B. Then, these stems were dried in an oven at a temperature of 40° C. for approximately 18 hours. Once dried, the stems were ground with a food processor for 20 min until a fine powder was obtained. This powder was sieved to obtain a homogeneous particle size of less than 300 μm (FIG. 2A).

For the synthesis of multi-walled type carbon nanotubes (MWCNTs), the catalyst was prepared with a mixture of $Al_2O_3$, $Fe_2(C_2O_4)5H_2O$ and $Co(C_2H_3O_2)_2+4H_2O$ in a ratio of the weights of $Al_2O_3$ and the hydrated salts of Fe and Co of 2:2:10. This mixture was calcined at a temperature of 650° C. Then, chemical vapor deposition (CVD) technique at a temperature of 800° C. was employed for nanotube synthesis using ethylene and argon at flow rates of 200 sccm. The carbon nanotube dispersion is shown in the image in FIG. 2B (left).

Cellulose nanofibers where chosen to be used, which were obtained from the University of Maine, USA. These were in a 3% w/v water suspension format (FIG. 2B, right).

First, the powder of *D. geminata* stems was mixed with the MWCNTs. Then, this mixture was added to the suspension of cellulose nanofibers and mixed at a speed of 15,000 rpm for 20 min, where a paste was formed (FIG. 2C). As a control for subsequent analyses, a mixture of *D. geminata* stem powder and cellulose nanofibers, without adding MWCNTs, and a control with only cellulose nanofibers were also prepared. After this, the pastes were poured into 30×30 cm molds with a thickness of 2.5 cm and left to dry at room temperature for 48 hours. FIG. 2D shows the membrane of *D. geminata* stems and nanofibrillated cellulose, and FIG. 2E shows the membrane of *D. geminata* stems, nanofibrillated cellulose and MWCNTs.

Figure 3:
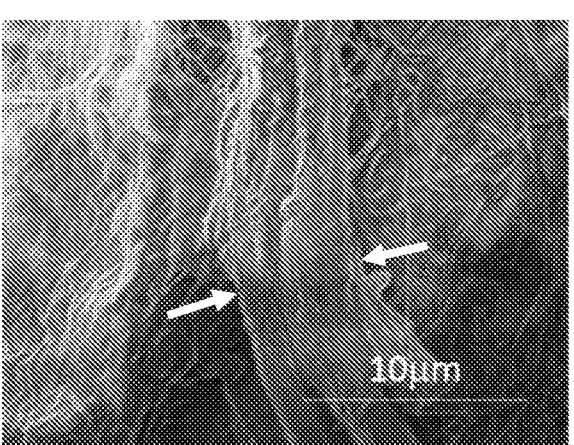
FIG. 3 shows SEM electron microscopy images of the membrane comprising *D. geminata*, nanofibrillated cellulose and carbon nanotubes at different scales.
Figure 3:
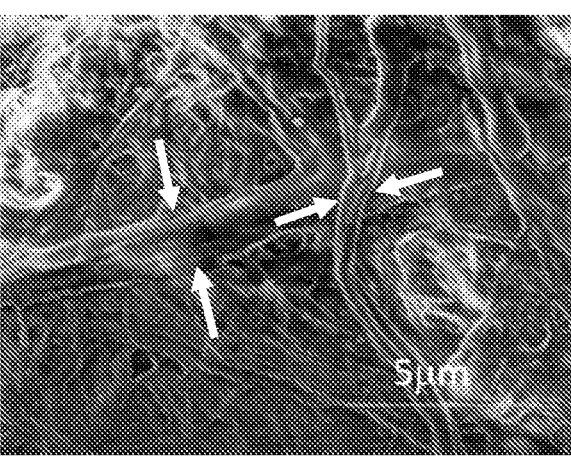
Figure 3:
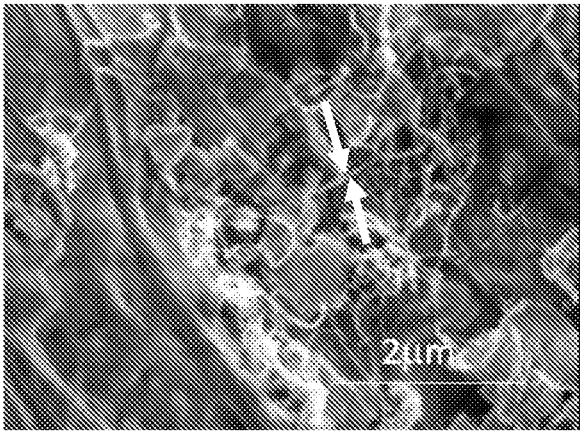

SEM electron microscopy analyses of the membrane comprising *D. geminate* stems, nanofibrillated cellulose and MWCNTs were performed. FIG. 3A shows a 10 μm-scale image with arrows pointing to *D. geminata* stems, FIG. 3B shows a 5 μm-scale image with arrows pointing to nanofibrillated cellulose fibers, and FIG. 3C shows a 2 μm-scale image with arrows pointing to MWCNTs.

Example 2. Membrane Evaluation for Removing Heavy Metal

The efficiency of this membrane to adsorb heavy metals was evaluated by means of a kinetic-type experiment. For this purpose, 128 flasks of solutions with known concentrations of lead ions ($Pb^{+2}$) in the range of 50 to 200 mg/L were prepared. These solutions were prepared from the $Pb(NO_3)_2$, salt. The volume of solution used depended on the size of the membrane. In this case, the 50 mL volume of solution that was in the flasks was maintained at a fixed temperature ranging from 30 to 40° C.

For this experiment, 4 types of membranes were prepared: nanofibrillated cellulose membrane (NFC), nanofibrillated cellulose membrane and *D. geminata* (NFC+Didymo), nanofibrillated cellulose membrane and carbon nanotubes (NFC+CNTs) and nanofibrillated cellulose membrane, *D. geminata* and carbon nanotubes (NFC+Didymo+CNTs). Each of these membranes was cut into 4 cm edge squares, which were left individually in the lead ion solutions previously prepared for periods of time of 5 minutes, 30 minutes, 1, 3, 6, 12 and 24 hours. Each experiment was conducted in quadruplicate.

After that exposure period, the membranes were quickly removed from the lead solution and the solutions were stored for later measurement. The concentration of lead in each solution (an indicator of what was not absorbed on the membrane) was analyzed by atomic absorption (AAS).

Figure 4:
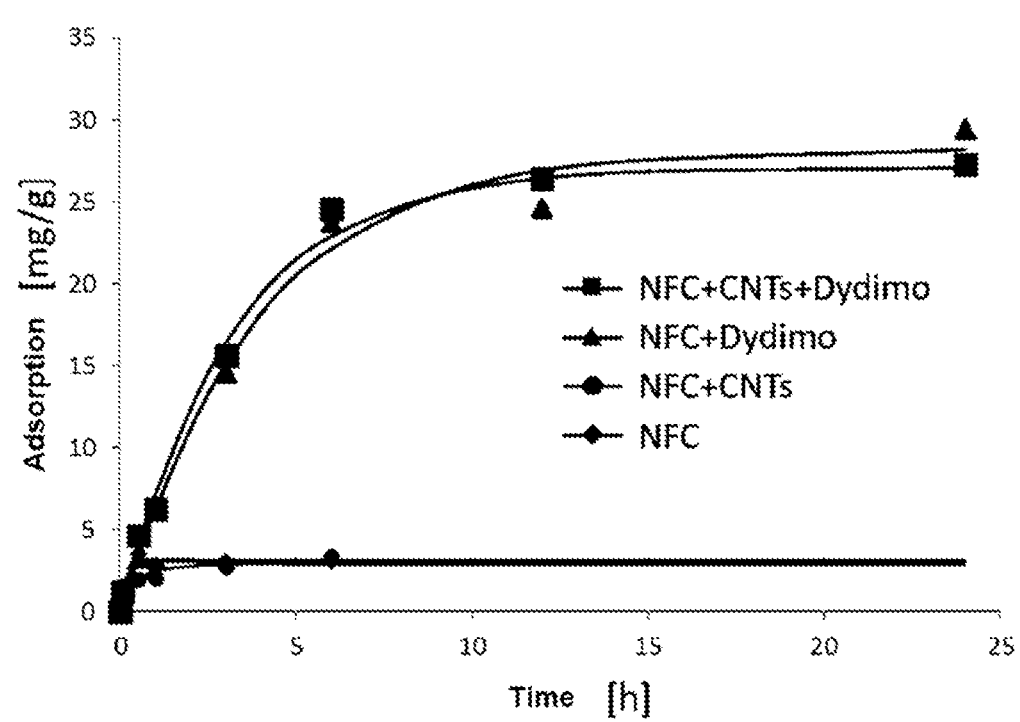
FIG. 4 shows the results of the $Pb^{+2}$ adsorption assay over time.
Figure 4:
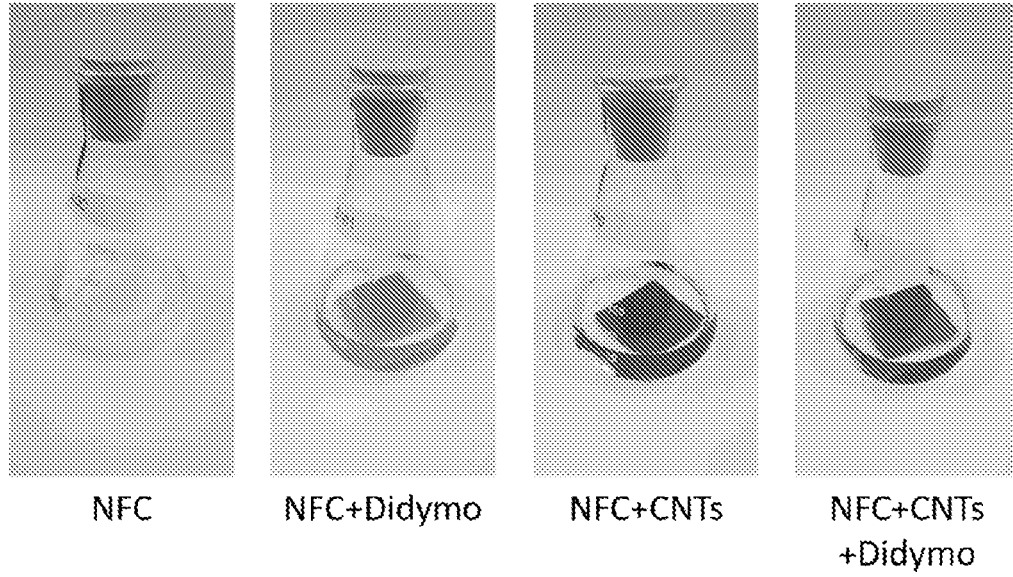

As seen in FIGS. 4A and 4B, significant capture of lead ions occurred from the aqueous solution in contact with the membrane of the present invention. When compared with the control membranes, it was observed that the adsorption effect is caused by the presence of *D. geminata* stems and carbon nanotubes. Therefore, with the use of the membrane of the present invention a significant reduction in the amount of heavy metals present in contaminated aqueous media can be achieved. It was also observed that after 18 hours the membrane would still be effective in adsorbing heavy metals, since it has not reached its saturation level.

The invention claimed is:

1. A membrane for removing heavy metals present in contaminated water or solutions, characterized in that it comprises nanofibrillated cellulose, multi-walled carbon nanotubes and diatom biomass stems from *Didymosphenia geminata*, and characterized in that the diatom stems are in a powdered form having a particle size of 100 μm to 1,000 μm.

2. The membrane according to claim 1, characterized in that the multi-walled carbon nanotubes are in a concentration of 0.5-3% w/w of a total weight of the membrane.

3. The membrane according to claim 1, characterized in that the diatom stems are in a ratio of between 1:1 to 4:1 with respect to nanofibrillated cellulose.

4. A method for obtaining a membrane for removing heavy metals present in contaminated water or solutions, characterized in that it comprises the steps of:

a. providing diatom stems from *Didymosphenia geminata*, multi-walled carbon nanotubes, and a suspension of nanofibrillated cellulose;

b. mixing the diatom stem with the carbon nanotubes to obtain a mixture;

c. adding the mixture into the suspension of nanofibrillated cellulose and mixing until a paste is formed; and d. drying the paste to obtain the membrane.

5. The method according to claim 4, characterized in that the step of mixing until the paste is formed is performed at a speed of 15,000-18,000 rpm for 5 to 30 minutes.

6. The method according to claim 4, characterized in that the paste is dried at a temperature of 20-25° C. for 12 to 18 hours.

7. The method according to claim 4, characterized in that the multi-walled carbon nanotubes are synthesized using a chemical vapor deposition method to provide the multi-walled carbon nanotubes.

8. The method according to claim 7, characterized in that the chemical vapor deposition method uses a catalyst, wherein said catalyst comprises $Al_2O_3$ and hydrated salts of Fe and Co.

9. The method according to claim 8, characterized in that the catalyst is synthesized by a method comprising the steps of:

a. mixing $Al_2O_3$, $Fe_2$ $(C_2O_4)5H_2O$ and $Co(C_2H_3O_2)_2 +$ $4H_2O$ in a ratio of 1:1:10 and 2:5:10 with respect to weight of $Al_2O_3$ and the hydrated salts of Fe and Co to obtain a mixture; and b. calcining the mixture at a temperature of 600-750° C. until the catalyst is obtained.

10. The method according to claim 9, characterized in that the $Al_2O_3$, $Fe_2(C_2O_4)5H_2O$ and $Co(C_2H_3O_2)_2 + 4H_2O$ are mixed in a ratio of 2:2:10 and 2:4:10 with respect to the weight of $Al_2O_3$ and the hydrated salts of Fe and Co.

11. The method according to claim 7, characterized in that the chemical vapor deposition method uses ethylene and argon at flow rates of 100 and 500 sccm.

12. The method according to claim 7, characterized in that the chemical vapor deposition method is performed at a temperature of 700-800° C.

13. The method according to claim 4, characterized in that for obtaining the diatom stems from *Didymosphenia geminata*, the method further comprising the steps of:

a. extracting the *Didymosphenia geminata* from an environment where it is found;

b. mixing the *Didymosphenia geminata* with an ethanol solution and stirring to obtain a mixture; and c. filtering the mixture to obtain a solid phase and a liquid phase, where the solid phase contains the diatom stems.

14. The method according to claim 13, characterized in that the environment is selected from the group consisting of a marine environment and a freshwater environment.

15. The method according to claim 14, characterized in that the freshwater environment is selected from the group consisting of a river and a lake.

16. The method according to claim 13, characterized in that the steps (b) and (c) are repeated between 2 to 8 times.

17. The method according to claim 13, characterized in that the ethanol solution is of 50% to 70% v/v.

18. The method according to claim 13, characterized in that the stirring is performed by means of ultrasound between 30 and 50 kHz for 10 to 30 minutes.

19. The method according to claim 13, characterized in that the diatom stems from *Didymosphenia geminata* are in a powdered form and wherein for obtaining the powdered form the method further comprises the steps of:

a. drying the diatom stems to obtain dried stems;

b. grinding the dried stems to obtain ground stems;

c. sieving the ground stems to obtain the powdered form having particles of a size of 100 to 1000 μm.

20. The method according to claim 19, characterized in that the diatom stems are dried at a temperature of 20-70° C. for 12 to 18 hours.

21. The method according to claim 19, characterized in that the dried stems are ground for 5 to 30 minutes.

22. The method according to claim 19, characterized in that the size of the particles of the powdered form is 300 μm.

23. A method for removing heavy metals present in contaminated water or solutions, characterized in that it comprises the steps of:

a. providing a membrane comprising nanofibrillated cellulose, multi-walled carbon nanotubes and diatom stems from *Didymosphenia geminata*; characterized in that the diatom stems are in a powdered form having a particle size of 100 μm to 1,000 μm;

b. contacting the membrane with the contaminated water or solutions allowing the membrane to adsorb the heavy metals; and c. removing the membrane with the adsorbed heavy metals from the contaminated water or solutions.

24. The method according to claim 23, characterized in that the membrane adsorbs heavy metals that are selected from the group consisting of lead, arsenic, copper, mercury, chromium, cadmium, cobalt, magnesium, manganese, calcium, nickel, and molybdenum.

25. The method according to claim 23, characterized in that said method further comprises a desorption step of the adsorbed heavy metals.

26. The method according to claim 25, characterized in that the desorption step comprises exposing the membrane to an acidic solution.

27. The membrane according to 1, characterized in that the particle size of the powdered form is 300 μm.

* * * * *